United States Patent [19]

Pirotte

[11] Patent Number: 4,924,808
[45] Date of Patent: May 15, 1990

[54] LITTER FOR SMALL ANIMALS

[76] Inventor: Wilhelm Pirotte, Postbox 4106, D-5202 Hennef, Fed. Rep. of Germany

[21] Appl. No.: 245,556

[22] Filed: Sep. 19, 1988

[30] Foreign Application Priority Data

Sep. 29, 1987 [DE] Fed. Rep. of Germany ....... 3732807

[51] Int. Cl.⁵ ............................................. A01K 29/00
[52] U.S. Cl. ....................................................... 119/1
[58] Field of Search ............................................ 119/1

[56] References Cited

U.S. PATENT DOCUMENTS 4,258,660  3/1981  Pris et al. ................................. 119/1
4,827,871  5/1989  Morrison ................................. 119/1

Primary Examiner—John Weiss
Attorney, Agent, or Firm—Panitch, Schwarze, Jacobs & Nadel

[57] ABSTRACT

For producing litter for small animals and more especially litter of cats straw is firstly ground to produce powdered straw which is then pressed to form briquettes and the latter are broken down into irregular fragments with dimensions of the order of a few millimeters and which are very well tolerated by the animals, have a high absorbency and easily disposed of.

6 Claims, 1 Drawing Sheet

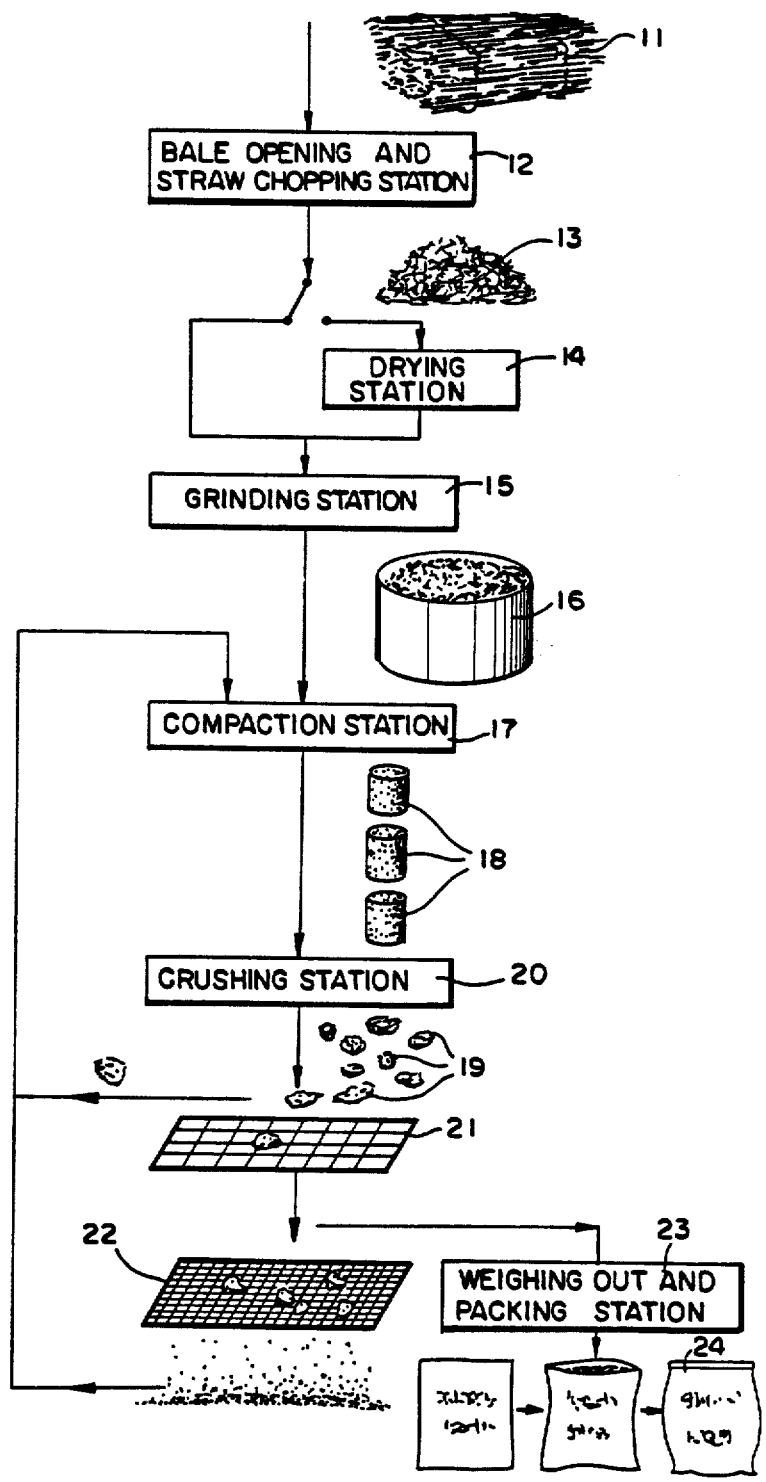

LITTER FOR SMALL ANIMALS

BACKGROUND OF THE INVENTION

The invention relates to litter for small animals and more especially to a form of litter suitable for cats of which at least a major fraction consists of powdered straw. Furthermore the invention relates to a method of manufacturing such litter in which the straw is ground and compacted by pressing.

Litter suitable for domestic cats is used for the litter tray where it has the function of absorbing and inactivating liquid excrement and preventing the development of bad odors. Conventional litter for cats consists of mineral chips or fibers or of a corresponding synthetic material, that is to say of a material which has many disadvantages such as the evolution of dust, a low degree of absorbency, insufficient power to prevent odors and disadvantages in connection with the disposal of the material after use.

Cat litter produced from waste paper and sawdust as a waste product stemming from mechanical production processes is chemically pretreated and is thus limited in its range of application. Like litter in the form of mineral substances it forms objectionable refuse harmful to the environment.

Furthermore litter tray material in the form of rolls has the disadvantage that cats often refuse to use it, since when the cat arches its back to "do its business" the material starts rolling up under its paws.

SHORT SUMMARY OF THE INVENTION

One object of the present invention is to provide an organic litter for small animals which is more satisfactory as regards overcoming the disadvantages noted above.

In order to achieve this or other objects the litter for small animals in accordance with the invention is characterized in that its fraction of straw material is in the form of irregular fragments of straw briquettes.

Furthermore a process for the manufacture of such material is characterized in that after compaction of the powdered straw to form briquettes, the latter are comminuted to form fragments with an irregular outer surface.

The litter for small animals in accordance with the invention has straw as its basic component so that it differs from mineral litter since it is of organic origin. Owing to the basic material and to the process of manufacture there is less trouble through the development of dust, and any dust present is less harzardous to health than dust from mineral litter. Thus the novel litter is very well tolerated. Chemical additives for processing or preservation are not required. The odors caused by the animal excrement are particularly quickly rendered harmless by conversion. The irregular fragments have a large surface for absorption and break down even further under the action of moisture, this increasing the absorbency to an even greater extent. Owing to the minimum size of the briquettes and the ultimate fragments the latter do not break down with the formation of powder or mush and in use keep their granular form.

The litter in accordance with the present invention is particularly free of any tendency to impair the environment. The natural fiber therein is able to be fully biologically degraded. The spent litter may be either disposed of by composting or by placing in small amounts of it at a time in the WC.

EXAMPLE OF THE INVENTION.

The invention will now be further explained in what follows in an example.

The straw used is a normal, health cereal straw, which is dried to have a moisture content of between 8% and 14% and then chopped and lastly finely ground. The powdered straw so obtained is made into briquettes by commpaction, the dust then produced being shaken out through screens and drawn off pneumatically.

The briquettes are cylindrical bodies with a diameter of approximately 8 to 10 mm and a length of the order to 20 mm at the most. However in this form they are not fully suitable for use a litter. The briquettes are thus comminuted to produce smaller, irregular fragments, as for example by impact crushing or by compression of the cylindrical briquettes in the direction of the respective axis. In this case as well the dust is partly let off in a downward direction through screens and partly drawn off in an air current. During such crushing treatment irregular fragments are produced with a thickness of one to a few millimeters and which may be directly used a litter for cats. A layer of 5 cm lasts a few days.

The briquettes should not be smaller than 8 to 10 mm and at the most the diameter should be 5 mm, since otherwise the fragmentation in the form described above is not possible. The fragments produced furthermore are of such a size that they have an efficient absorbing effect without however being spontaneously converted by the liquid back into the powder form. All in all the ability to swell is so satisfactory that owing to the absorption of the water the volume of the litter is more than doubled without the material then assuming a mush-like or bog-like form.

As compared with mineral litter there is a threefold increase in absorbency.

DESCRIPTION OF WORKING EXAMPLE SHOWN IN THE FIGURE

The drawing is a flow chart of the process of manufacture of the litter. Bales of the straw 11 supplied are broken up in a bale opening and straw chopping station 12 so that straw stalk fragments 13 are produced which are dried in a drying station 14 if the moisture content is in excess of 14%. After such drying if needed (the drying station 14 may be bypassed if not required) the straw stalk fragments 13 are finely ground in a grinding station 15. The powdered straw 16 so produced is compacted in a compaction station 17 to form cylindrical briquettes 18, which are comminuted to form irregular fragments 19 generally in the form of disks in a crushing station 20. On a coarse screen 21 the excessively large fragments are separated from the rest of the material and then on fine screen 22 the excessively small fragments and dust are removed and recycled to the compacting station 17, while the fragments 19 are supplied to a weighing out and packing station 23 and placed in sacks 24.

I claim:

1. Litter for small animals, of which at least a major fraction is in the form of ground and pressed straw, such straw material being in the form of irregular fragments of briquettes made from compacted ground straw.

2. A process for the manufacture of litter for small animals comprising the steps of grinding straw to form straw powder and compacting such powdered straw to form briquettes, which are then broken into fragments with an irregular outer surface.

3. The process as claimed in claim 2 wherein said powdered straw is formed into elongated straw briquettes, which are crushed by the application of a force acting in the (longitudinal direction thereof.)

4. The process as claimed in claim 2 wherein such briquettes of powdered straw produced by pressing are broken up by impact.

5. The process as claimed in claim 2 wherein the straw is chopped and is dried down to a moisture content of 8 to 14% prior to grinding.

6. The process as claimed in claim 2 wherein the powdered straw is pressed to form powdered straw briquettes with a diameter between 8 and 15 mm and is then broken down into oblique irregular fragments with a thickness of 1 to 4 mm.

* * * * *